April 24, 1956 C. O. LARSON 2,742,939
SHEET METAL LOCK NUT WITH YIELDING FLANGE
Filed Aug. 7, 1951
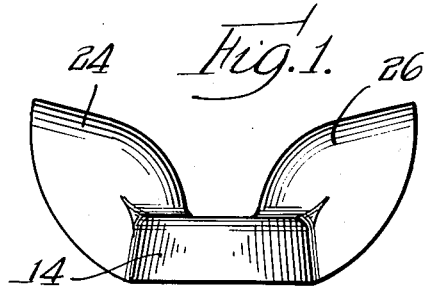
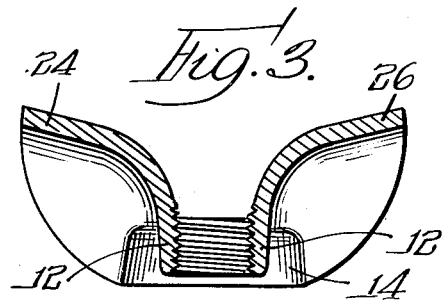
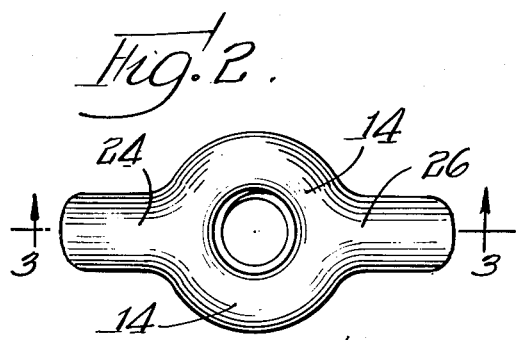
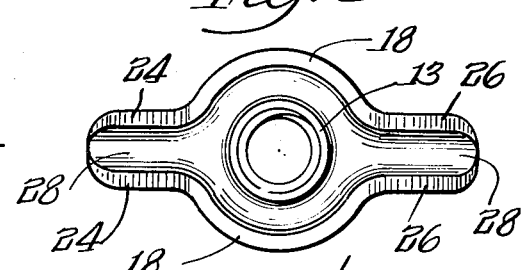
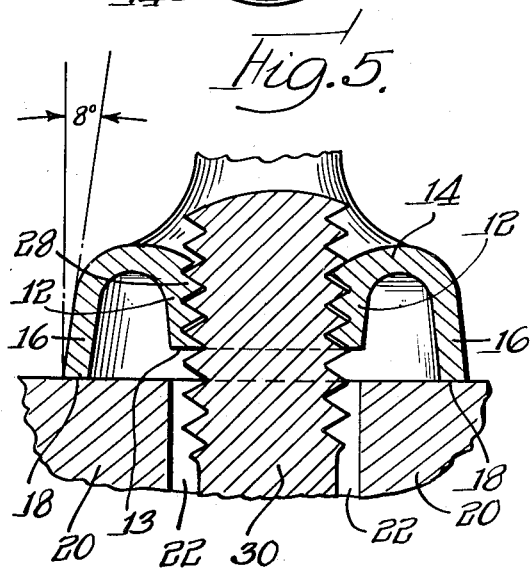
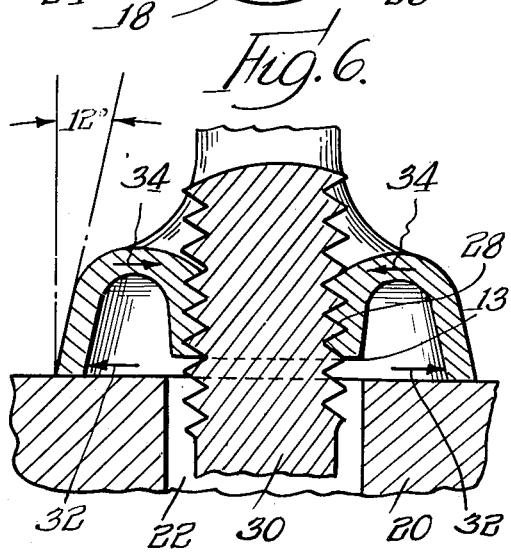
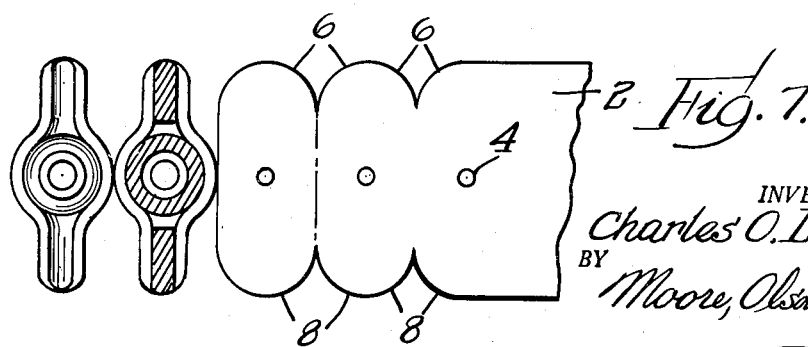
INVENTOR.
Charles O. Larson
BY
Moore, Olson & Trexler
attys.

United States Patent Office 2,742,939
Patented Apr. 24, 1956

2,742,939

SHEET METAL LOCK NUT WITH YIELDING FLANGE

Charles O. Larson, Sterling, Ill.

Application August 7, 1951, Serial No. 240,655

2 Claims. (Cl. 151—21)

This invention relates to wing nuts preferably formed from a sheet metal blank by means of metal stamping, piercing, bending and threading operations whereby without further processing operations the wing nut is given a thread locking function with respect to a threaded bolt.

The present application is a continuation-in-part of my prior application, Serial No. 670,570, filed May 17, 1946 and now abandoned.

The objects of the present invention are to provide a wing nut threadable onto a bolt and having a deformable skirt engageable with a surface of the piece to be held to cause the wing nut to lock in engaged position.

Yet another object resides in forming a sheet metal wing nut from sheet metal by means of metal stamping, bending, stretching, piercing and metal threading operations wherein the wing nut is formed with smooth exterior walls including a centrally disposed internally threaded sleeve or hub having diametrically extending upwardly and outwardly formed wings for turning and wherein the bottom edge of the internally threaded sleeve is resultantly formed ragged or rough by the metal stretching, piercing and threading operations so as to have a locking action on the threads of the bolt.

Yet another object of the invention resides in providing a sheet metal wing nut including an inner sleeve having integrally formed therewith an outer skirt concentrically spaced from said sleeve except at two diametrically opposite zones wherein said skirt is formed with spaced, parallel folds of sheet metal stretched or bent upwardly substantially above the top portion of the central sleeve and wherein the bottom concentric portions of said skirt are disposed substantially above the bottom edge of said inner sleeve and wherein the inner wall of said inner sleeve is threaded and due to such threading operation is reduced in thickness relatively to the thickness of said outer skirt wall and wherein the bottom annular edge of such inner sleeve is left ragged whereby when said wing nut is tightened on a threaded bolt the bottom edges of the outwardly spaced skirt walls contacting the surface of the work through which the bolt passes, thereby causing the skirt walls to spread outwardly in turn causing the thinner internally threaded walls of the sleeve to grip the thread of the bolt and lock thereon.

Yet another object of the invention resides in the method of forming a one piece wing nut with the thread locking action upon sheet metal by means of blank stamping, stretching, bending, piercing, and threading operations, and wherein one or more of these operations combine to provide self-locking characteristics to the wing nut.

These and other objects of the invention will be apparent from a perusal of the following specification when taken in connection with the accompanying drawings wherein:

Fig. 1 is a side elevation of the wing nut with self-locking features;

Fig. 2 is a plan view thereof;
Fig. 3 is a section on line 3—3 of Fig. 2;
Fig. 4 is a bottom plan view;
Fig. 5 is an enlarged section on line 5—5 of Fig. 1;
Fig. 6 is a similar view showing the locking operation; and
Fig. 7 is a view showing the successive steps in the method of making the wing nut.

Referring now to the drawings in detail, the wing nut is formed integrally from a sheet metal blank 2 by a feeding operation of the relatively long flat blank of sheet metal 2 to a series of process stations where the blank is suitably pierced centrally as at 4 to initiate the central sleeve or hub forming operation. At the same time or before or after the blank is subject to a stamping operation at which the side walls of the blank 2 are formed by forming the inwardly extending opposed cuts 6 and 8. Thereafter at the next metal working station the blank thus cut is subjected to a die shaping operation which stretches and bends the metal of the thus preformed blank to form the central sleeve or hub 10 which is formed by the die with relation to the central portion of the blank preliminarily pierced as at 4. In this metal drawing and metal stretching or extrusion operation in forming this central sleeve or neck 10 the wall 12 of this sleeve is stretched to thinner cross section and turned downwardly inwardly as indicated at 12. So also through the proper die formation the surrounding metal of the blank is bent outwardly as at 14 at two diametrically opposed portions each forming a relatively long arcuate cup-like portion concentrically about the annular central sleeve or neck 12. The outer walls of these two relatively long arcuate portions 14 extend downwardly as arcuate skirts 16, the walls of which are preferably slightly flaring or extending outwardly downwardly from the top wall portions 14 and the bottom arcuate edges 18 of these arcuate skirts 16 are adapted to engage the material 20 to be clamped and through which the bolt hole 22 is formed.

At diametrically opposite portions the metal blank is folded and bent by appropriate dies or other agencies upwardly and outwardly in opposed folds the walls 24 and 26 of which are spaced apart as at 28 to form a pair of diametrically opposed folds forming wings of metal which are formed integral with the cup or skirt portions 16 and with also the integrally formed central sleeve or neck portions 12.

It is to be noticed that the inner sleeve walls 12 and the annular bottom edge 13 thereof lies well above the horizontal plane of the bottom edges 18 of the skirt portions 16.

It is also to be noted that the opposed folds 24—24 and 26—26 are bent upwardly and outwardly starting substantially at their junctions with the arcuate skirt walls 16—16 and that such upwardly bent wing portions 24 and 26 lie for the greater portion of their area above the top plane of the top edge of the annular central sleeve or hub 10 whereby affording generous upwardly outwardly extending wings easily accessible for grasping and turning. The upward angularity of these opposed wings 24—26 is substantial. It should also be noted that the web portions 28—28 connecting the opposed folds 24—24 and 26—26 merge directly with the axially extending annular wall 12 of the sleeve 10. This structure greatly increases the resistance of the wings to bending under the forces used to tighten the nut. Furthermore, the web portions 28 merge with the annular wall 12 at such an angle that the lower portions of the webs 28 are spaced apart a distance less than the outer diameter of the threads 29 formed in the sleeve 10, or, in other words, the lower portions are spaced apart a distance which is substantially equal to the internal diameter of the sleeve 10. Thus, the threads 29 are cut in the lower portions of the webs 28, as is clearly shown in Fig. 3. This in effect increases the length of the sleeve 10 and gives the nut greater holding power.

The inner wall surface of the central sleeve 12 which has been somewhat reduced in thickness relatively to the thickness of the skirt wall 16 thickness, is still further reduced by an internal threading operation as at 29. This internal thread 29 and particularly at the bottom edge 13 of the inner sleeve 12 provides a deformable threaded sleeve through which the correspondingly threaded bolt shank 30 screws, and the construction is such that as shown in Figs. 5 and 6 as the wing nut is screwed home the lower edges 18 of the two skirts 16 contact the face of the work 20. The walls 16 of these skirts normally lie at a slight angle to the vertical, such as an angle of about eight degrees. As the pressure due to screwing home the nut continues, the skirts 16 are forced or spread outwardly as indicated by the twelve degree angle and by the arrows 32 of Fig. 6, whereby to cause the upper wall of the skirt indicated by the arrows 34 to shift slightly inwardly and cause the upper teeth of the sleeve 12 lockingly to grip the thread of the bolt 30. This locking action is assisted by the fact that the inner sleeve wall 12 is thinner than the skirt wall 16, due to the metal stretching in forming sleeve 12 and also due to the threading operation.

Hence by this construction there has been produced a wing nut having a smooth outer surface which will not tear or scratch the hand of the user and which due to the metal working operations in forming the nut including the blank bending, piercing and stretching operations in forming the die, the central sleeve coupled with the internal threading operation provides a relatively thinner threaded sleeve wall in combination with outer spaced and substantially enclosing or exterior arcuate skirt walls that form the sole pressure contact with the face of the work to be clamped by the bolt passing through said work, so that on increase of clamping pressure the skirt walls will be deformed outwardly in a manner to cause a sufficient deformation of the relatively thinner threaded sleeve walls 12 while in threaded contact with the clamping bolts whereby to exercise a locking effect of the wing nut on the bolt.

The arrows 34 of Fig. 6 show the lateral forces of deformation produced by the outward spreading of the skirt walls 16.

Having thus described the invention, what is claimed as new and desired to be secured by Letters Patent is:

I claim:

1. A wing nut formed of a single integral piece of sheet metal comprising a generally cup-shaped central portion including two opposed relatively long arcuate skirts the free edges of which lie in a common plane, the adjacent ends of said skirts being spaced apart, said central portion between said arcuate skirts being bent upwardly and outwardly in spaced folds to provide wings, and a continuous cylindrical sleeve formed integral with said cup-shaped central portion in the center thereof and extending toward the plane of the free edges of said skirts but terminating substantially short of said plane, the inner face of said sleeve being threaded to receive a complementarily threaded fastening member, a portion of the walls of said sleeve adjacent the junction of said sleeve with said cup-shaped central portion being relatively thinner than said skirts, said skirts normally diverging outwardly toward the lower edges thereof at an angle on the order of 8° with respect to the longitudinal axis of the sleeve and operable on screwing of the wing nut against an associated work surface to spread outwardly and cause distortion of said thinner portion of the walls of said sleeve to lock the threads on said sleeve to the threads on the associated fastening member.

2. A wing nut formed of a single integral piece of sheet metal comprising a generally cup-shaped central portion including two opposed relatively long arcuate skirts the free edges of which lie in a common plane, the adjacent ends of said skirts being spaced apart, a continuous cylindrical sleeve formed integral with said central portion substantially in the center thereof and extending toward the plane of the free edges of said skirts but terminating substantially short of said plane, said central portion being bent between said skirts upwardly and outwardly in spaced folds having their upper edges joined by connecting webs to provide wings, said webs extending upwardly from said sleeve and then outwardly, and threads formed on the inner wall of said sleeve and continuing upwardly into the confronting surfaces of the web to receive a complementarily threaded fastening member, a portion of said sleeve adjacent the junction of said sleeve and said central portion being relatively thinner than said skirts, said skirts normally diverging outwardly from said sleeve toward the free edges of the skirts at an angle of about 8° with respect to the axis of the sleeve and operable on screwing of the wing nut against an associated work surface to spread outwardly and cause distortion of said thinner portion at the junction of said sleeve and said central portion to lock the threads of said sleeve to the threads of the associated threaded fastening member.

References Cited in the file of this patent

UNITED STATES PATENTS

| | | |
|---|---|---|
| 1,063,146 | Zitzerman | May 27, 1913 |
| 1,330,594 | Kraft | Feb. 10, 1920 |
| 1,981,363 | Kimbell | Nov. 20, 1934 |
| 2,005,348 | Michell | June 18, 1935 |
| 2,154,174 | Marchou | Apr. 11, 1939 |
| 2,287,691 | Marchou | June 23, 1942 |
| 2,383,141 | Maage | Aug. 21, 1945 |
| 2,397,238 | Brose | Mar. 26, 1946 |
| 2,399,090 | Ballak | Apr. 23, 1946 |

FOREIGN PATENTS

| | | |
|---|---|---|
| 308,851 | Great Britain | Apr. 4, 1929 |
| 599,533 | Germany | May 20, 1933 |